United States Patent [19]
Sainte Luce Banchelin et al.

[11] Patent Number: 4,837,448
[45] Date of Patent: Jun. 6, 1989

[54] PROTECTIVE SHEATH FOR ELECTRICAL OR OPTICAL CONDUCTORS HARDENED WITH RESPECT TO X-RAYS

[75] Inventors: Jean Sainte Luce Banchelin, Le Haillan; Jean Bourcereau, Bordeaux; Yves Valy, St. Medard en Jalles, all of France

[73] Assignee: Aerospatiale Societe Nationale Industrielle, Paris, France

[21] Appl. No.: 35,742

[22] Filed: Apr. 8, 1987

[30] Foreign Application Priority Data

Apr. 16, 1986 [FR] France ................. 86 05443

[51] Int. Cl.$^4$ .............................................. G21F 1/12
[52] U.S. Cl. ............................. 250/519.1; 250/515.1
[58] Field of Search ............... 250/505.1, 515.1, 517.1, 250/519.1; 252/478

[56] References Cited

U.S. PATENT DOCUMENTS

| | | | |
|---|---|---|---|
| 2,162,178 | 6/1939 | Marasco | 250/519.1 |
| 3,039,001 | 6/1962 | Park | 250/519.1 |
| 3,536,920 | 10/1970 | Sedlak | 250/519.1 |
| 3,576,387 | 4/1971 | Derby | 174/36 |
| 3,608,555 | 9/1971 | Greyson | 250/519.1 |

FOREIGN PATENT DOCUMENTS 2439460  6/1980  France .
2484688  6/1980  France .

OTHER PUBLICATIONS

Patent Abstract of Japan, vol. 8, No. 129.

Primary Examiner—Jack I. Berman
Attorney, Agent, or Firm—Pearne, Gordon, McCoy & Granger

[57] ABSTRACT

Protective sheath for optical or electrical conductors hardened with respect to X-rays.

It comprises a flexible sheath formed from a resin matrix containing in regularly dispersed powder form at least one metal and/or at least one inorganic compound of a metal, said metal having a high atomic number of at least 47, a covering placed between the optical fibre and the X-ray protection sheath and optionally a mechanical protection sheath made from plastic directly covering the optical fibre.

14 Claims, 2 Drawing Sheets

PROTECTIVE SHEATH FOR ELECTRICAL OR OPTICAL CONDUCTORS HARDENED WITH RESPECT TO X-RAYS

BACKGROUND OF THE INVENTION

The present invention relates to a protective sheath for an electrical or optical conductor or a group of electrical or optical conductors, said protective sheath being hardened with respect to X-rays. It applies in all fields where it is necessary to provide X-ray protection for the transmissions of signals by electrical or optical conductors.

In particular, the invention applies to the protection of electrical and optical conductors used in the medical, nuclear (test and power stations), aeronautical and space fields.

Electrical conductors refer to all metal wires or cables especially designed for carrying electrical currents, such as coaxial telephone cables, television cables, etc. The term optical conductors covers all optical cables or fibres for carrying light signals.

It is pointed out that an optical fibre is a very fine rod of a material (synthetic, borosilicate or silica glass) which is stretched and whose filiform appearance gives it great flexibility. This optical fibre constitutes a light guide.

In general terms, an optical fibre is constituted by a dielectric medium, which is called the core and which is generally covered by a second medium, called the optical sheath, whose refractive index is below that of the core. However, it may have more complex structures and may in particular have several optical sheath layers, as described in FR-A-2 523 376.

Electrical and optical conductors are very sensitive to X-rays. Interference leads in the case of optical conductors to a darkening and in the case of electrical conductors to a disturbed electrical signal.

In order to obviate these undesirable effects, it is consequently necessary to lower the irradiation level of said conductors by protecting them against X-rays. One of the most widely used methods for reducing doses and dose rates received by electrical and optical conductors consists of placing them in X-ray-opaque channels, which are generally made from a metal with a high atomic number.

The metal and thickness of said channels are chosen and adapted as a function of the energy of the X-radiation in question and of the desired filtering level. These metal channels provide a very effective X-ray protection. Unfortunately in the case of electrical or optical conductors carried on board aircraft, said metal channels are much too heavy and cumbersome.

Moreover, it is difficult to route the electrical or optical conductors outside a clearly defined circuit, established as a function of the available locations for the channels. These positioning constraints mean that these channels are very costly. Moreover, it is difficult to work and use the most interesting metals for providing an effective X-ray protection, which further increases the cost of said channels.

More recently, in the case of electrical conductors, an X-ray protective sheath has been formed from one, two or even three braids of an alloy of a metal having a high atomic number and then covered by a silver layer. These protective sheaths are placed round the electrically insulating sheath surrounding the conductors.

Unfortunately the braiding method can leave "holes" with respect to the X-rays, which leads to a dispersion of said radiation. Moreover, it is disadvantageous from the weight standpoint, which can be highly prejudicial in connection with electrical conductors carried by aircraft.

Finally, one of the advantages of links by optical fibres is that of permitting a dielectric connection between boxes or cases. However, this advantage is lost with the braiding method.

The present invention relates to a protective sheath for electrical or optical conductors hardened with respect to X-rays and making it possible to obviate the various disadvantages referred to hereinbefore. In particular, said sheath permits an important gain as regards weight and overall dimensions, whilst still providing an effective protection against radiation with a high dose rate. Moreover, this X-ray protection sheath causes no particular manufacturing problem.

SUMMARY OF THE INVENTION

The present invention relates to a protective sheath for at least one electrical or optical conductor hardened with respect to X-rays, wherein it comprises a flexible X-ray protection sheath formed from a resin matrix, containing in the form of a regularly dispersed powder at least one metal and/or at least one inorganic compound of a metal, the metal having a high atomic number at least equal to 47. In particular, the powder can be constituted by a metal and an inorganic compound of said same metal or another metal.

The integration of the X-ray protection into the structure of the conductor makes it possible to route the said conductors along individual optimized paths, compared with the use of opaque channels.

This sheathing method also makes it possible to totally protect conductors against X-rays, from the source to the destination of said conductors, thus ensuring a "maximum optical sealing" for the optical conductors and effective interference suppression for the electrical conductors.

The X-ray protection sheath can be obtained by melting a thermoplastic or thermosetting resin, by intimately mixing the melted resin with the powder of a metal and/or an inorganic compound of a metal and by extruding the mixture in a die, in which travels the conductor to be protected.

This process has the advantage of simple performance and provides good results as regards the homogeneity of the X-ray protection sheath. During the operation there is a good centering of the X-ray protection sheath with respect to the conductor.

In the case of an optical conductor, the flexible sheath can simultaneously fulfill mechanical strength and X-ray protection functions. However, it is also possible to provide a supplementary mechanical protection sheath made from a flexible plastic material. This mechanical protection covers the X-ray protection sheath or is located between the X-ray protection sheath and the optical conductor.

In the same way, in the case of an electrical conductor, the flexible sheath can fulfill the electrical insulation function and the X-ray protection function. This is possible when the resin matrix and the powder embedded in said resin are good electrical insulants.

Conversely, when the flexible sheath is a poor electrical insulant, which is in particular the case for a metal powder, it is preferable to use a supplementary electrically insulating sheath to ensure a total electrical protection of said conductors. This insulating sheath is either placed above the X-ray protection sheath or between the latter and the electrical conductor.

The resin used for forming the matrix of the flexible X-ray protection sheath can be a flexible thermoplastic or thermosetting resin, such as an elastomer. In particular, it possible to use polyamides, polyethers, polyesters, phenoplasts, polyolefins, polyimides or silicones.

In order to ensure an adequate flexibility of the sheathed electrical or optical conductors, preference is given to the use of a thermoplastic resin of the polyether block amide or polyether block ester type, or a silicone resin.

The metal powder embedded in the organic matrix of the X-ray protection sheath can be a powder of silver, tin, antimony, barium, rare earth, tantalum, tungsten, rhenium, iridium, platinum, gold, lead, uranium, hafnium or a mixture of these metals.

When the powder is constituted by an inorganic compound, the latter can be an oxide, a nitride or a carbide of a heavy metal, like those referred to hereinbefore.

Advantageously the metal or inorganic compound constituting the powder dispersed in the matrix has a melting point equal to or above 630° C.

The use of material with a high melting point makes it possible to obviate undesirable effects due to thermal shocks caused within the material during X-irradiation, such as the surface melting of the grains of powder and which can lead to the destruction of the material. In particular, silver, tantalum, tungsten or uranium are used for a metal powder.

In the same way, for an inorganic compound, use is preferably made of an oxide, a nitride or a carbide of silver, tantalum, tungsten or uranium, if this effectively exists.

In order to optimize the X-ray protection over a very wide energy spectrum, it is possible to use one or more metals and/or one or more inorganic compounds for forming the powder, such as e.g. a mixture of tungsten and uranium dioxide ($UO_2$), a mixture of tantalum and uranium dioxide, or a mixture of barium and hafnium.

For equal quantities of X-ray protection material, the use of a powder regularly distributed in a resin matrix leads to a loss of efficiency compared with a quantity of solid metal of an identical nature to the powder used, all other conditions being identical. As this efficiency loss is essentially a function of the grain size of the powder and the powder quantity in the organic binder, preference is given to a powder having a grain size between 0.5 and 25 micrometers and e.g. ranging between 1.6 and 10 micrometers.

Moreover, the powder quantity in the binder can range between 25 and 50% by volume of the finished X-ray protection material. The doping quantity of the organic binder in said range is a function of the sought efficiency for the X-ray protection, as well as the desired flexibility for the sheath. The higher the powder quantity, the more effective the X-ray protection, but the less flexible the sheath.

In order to prevent the emission of electrons, in particular by the powder of the X-ray protection sheath, during X-irradiation, a covering formed from at least one element with a low atomic number, at the most equal to 6, can be placed between the optical or electrical conductor and the X-ray protection sheath. This covering has a thickness exceeding the mean free path of the electrons emitted during X-irradiation.

The element with the low atomic number which can be used can be carbon, boron or beryllium.

The material used for preventing missivity effects of electrons is generally known as anti-SGEMP material (system generating electromagnetic pulse). It can be in the form of a paint containing particles of the element with an atomic number at the most equal to 6.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
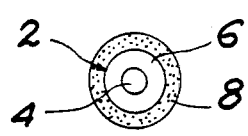
FIGS. 1 to 3, diagrammatically and in cross-section, three constructional variants of the protective sheath according to the invention for an optical fibre.
Figure 2:
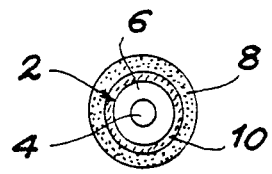
Figure 3:
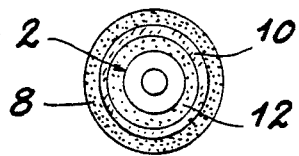

FIGS. 1 to 3 show in cross-section an optical fibre 2, which can be made either from glass, or from a plastic material. This optical fibre 2 comprises a core material 4 and an optical sheath 6, whose refractive index is below that of the core material. This optical fibre 2 can be one of those described in documents FR-A-2 523 316, FR-A-2 194 975, FR-A-2 382 155, EP-A-0 045 345, EP-A-0 093 395, EP-A-0 110 445, etc.

Optical fibre 2 is covered by a flexible sheath 8 providing the X-ray protection. Sheath 8 completely covers the optical sheath 6 of fibre 2 from one end to the other thereof.

This X-ray protection sheath 8 is e.g. formed from a tungsten powder representing 30% by volume of the sheath and regularly distributed in a flexible thermosetting resin, such as a silicone. This silicone resin is e.g. that sold by Rhone Poulenc under the reference RTV 1502, whose polymerization is catalyzed by RTV 1502B of Rhone Poulenc. The tungsten powder has a purity of 99.9%, an average grain size of 4 micrometers and a dispersion of 2.5.

This X-ray protection sheath 8 is relatively flexible, because it has an elongation at break exceeding 50%. It has a thickness of approximately 1 mm, in order to ensure effective X-ray protection.

The X-ray protection sheath 8 can also be constituted by a tungsten powder representing 30% of the volume of the sheath and dispersed in a Rhone Poulenc DINYL resin. This resin is a thermoplastic polyether block amide. The tungsten powder used has the same properties as hereinbefore.

It is also possible to replace the DINYL resin by the HYTREL resin of Dupont de Nemours, the latter being a thermoplastic polyether block ester.

The X-ray protection sheath 8 can also be constituted by a powder containing 6% by volume of tungsten and 24% by volume of uranium dioxide ($UO_2$) embedded in ATOCHEM PEBAX resin. This resin is a polyether block amide resin. Sheath 8 can have a thickness of 2 mm, in order to effectively filter the X-rays for a given application.

In order to prevent the emission of electrons by flexible sheath 8 during X-irradiation, between the optical sheath 6 of fibre 2 and the X-ray protection sheath 8 is placed a covering 10, as is diagrammatically indicated in FIGS. 2 and 3.

Covering 10, ensuring the anti-SGEMP function, entirely covers the optical sheath 6 and can in particular be made from beryllium or carbon.

This covering 10 has a thickness exceeding the free average path of the electrons emitted by sheath 8 during X-irradiation, namely a thickness between a few micrometers and a few dozen micrometers.

FIGS. 1 and 2 shows sheath 8 which, apart from its X-ray protection function, also has a mechanical strength function. However, as shown in FIG. 3, it is also possible to coat optical fibre 2 with a plastic material sheath 12 for ensuring the necessary mechanical strength. As shown in FIG. 3, mechanical sheath 12 is generally in direct contact with the sheath 6 of the optical fibre and is in particular inserted between optical sheath 6 and the anti-SGEMP covering 10. However, sheath 12 can also be positioned outside the X-ray protection sheath 8.

Figure 4:
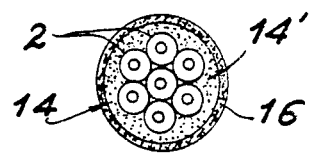
FIG. 4, diagrammatically and in cross-section, a bundle of optical fibres sheathed in accordance with the invention.

The protective sheathing described hereinbefore can also be used in the case of a group of optical fibres, as shown in FIG. 4. The latter shows a group 14 of optical fibres 2 identical to those shown in FIGS. 1 to 3. Group 14 is made round by silicone extrusion and the resulting group 14' is covered with a flexible sheath 16 which protects the fibres 2 against X-rays. Sheath 16 has the same composition as that described for the X-ray protection sheath 8.

Sheath 16 which entirely covers the group 14 of fibres can be used alone for ensuring both the mechanical protection and the X-ray protection functions, or can be used in combination with a mechanical sheath and optionally an anti-SGEMP covering, as described hereinbefore.

Figure 5:
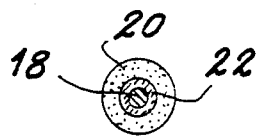
FIGS. 5 and 6, diagrammatically and in cross-section, two constructional variants of the inventive protective sheath for electrical conductors.

FIG. 5 shows an in particular copper electric wire 18, surrounded by a flexible sheath 20 providing both protection against X-rays and the electrical insulation of wire 18. Sheath 20 can be made from a silicone resin containing tungsten representing 30% by volume of the sheath.

In order to prevent emissivity of electrons, particularly by the protective sheath 20, it is possible to insert between the latter and conductor 18, a covering 22 fulfilling the anti-SGEMP function and which can be made in the manner described hereinbefore.

Figure 6:
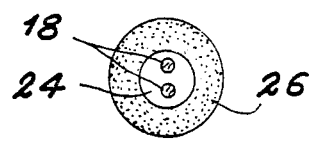

FIG. 6 shows two electrical wires 18 electrically insulated from one another by a plastic sheath 24, particularly made from silicone or epoxy resin. This electrically insulating sheath is covered by a sheath 26, which provides the X-ray protection of wires 18 and which is particularly constructed in the same way as sheath 8 (FIGS. 1 to 3).

Figure 7:
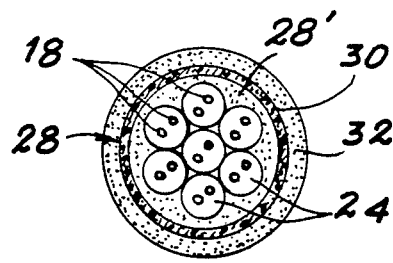
FIG. 7, diagrammatically and in cross-section, a group of electrical cables sheathed according to the invention.

FIG. 7 shows a group 28 of electric cables 18, which are electrically insulated and made round in the manner of FIG. 4. This group 28' of electric cables is covered with a covering 30 fulfilling the anti-SGEMP function and a flexible sheath 32 ensuring the X-ray protection function. Sheaths 24 insulate the wires 18.

Figure 8:
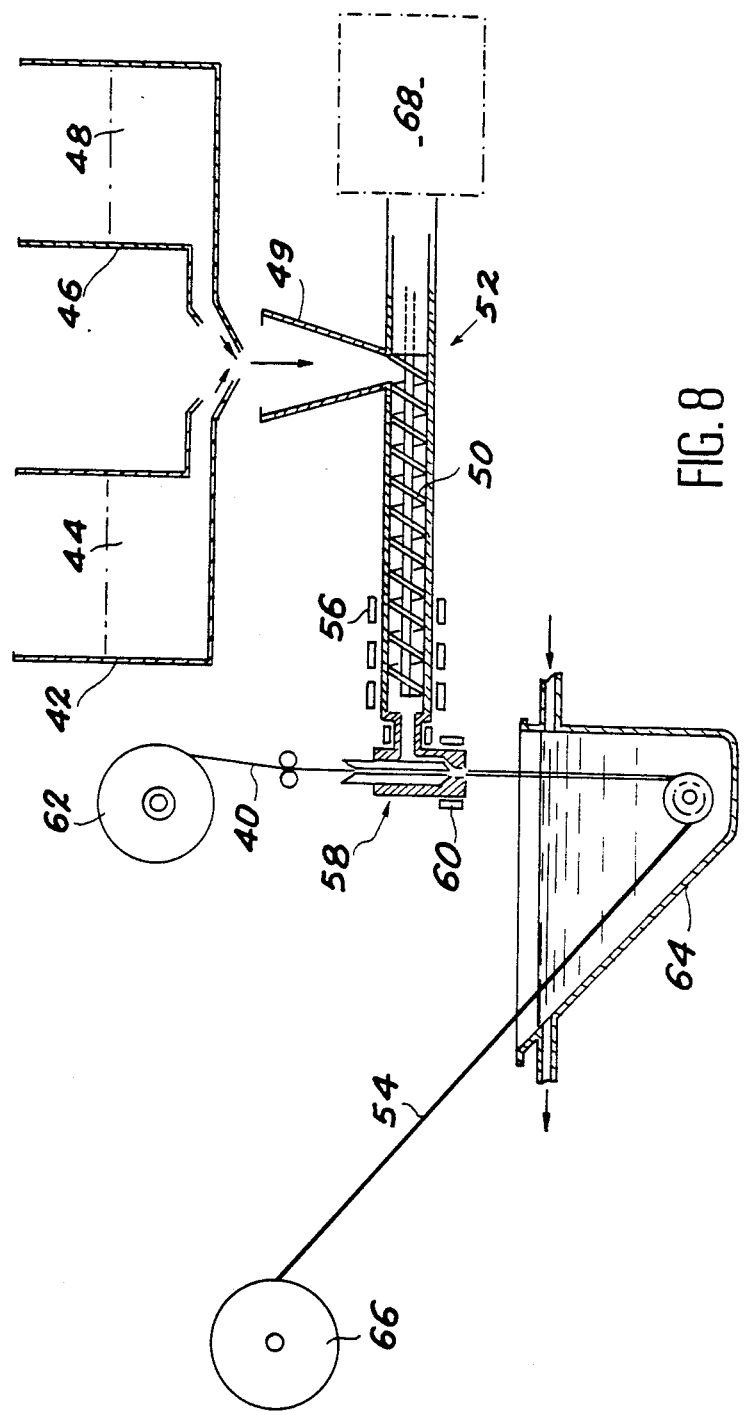
FIG. 8, diagrammatically an installation permitting the continuous sheathing of a conductor by the flexible X-ray protection sheath according to the invention.

FIG. 8 diagrammatically shows an installation permitting the continuous sheathing of an electrical or optical conductor 40.

This known installation comprises a doser 42 containing grains 44 of a thermoplastic resin and in particular a polyether block amide resin. In the same way, a doser 46 is provided for containing tungsten powder 48.

Dosers 42, 46 are calibrated so as to continuously supply, via a hopper 49, the screw 50 of an extruder 52 of the WERNER ZSK 30 extruder—mixer type at flow rates, whose relative proportions ensure the necessary tungsten powder level in the X-ray protection sheathing material 54. The lower part of the extruder is equipped with resistors 56 for melting the thermoplastic resin grains 44.

The bottom of extruder 52 is coupled to a sheathing die 58, also equipped with a resistor 60 for heating die 58. Resistors 56 and 60 are generally raised to a temperature permitting the softening of the resin, i.e. $200° \pm 10°$ C., e.g. for PEBAX.

Conductor 40 to be covered by the X-ray protection sheath 54 is mounted on an emitting reel 62, traverses the heated die 58 and a tank 64 containing water for cooling the conductor equipped with sheath 54 and is then received on a receiving reel 66.

Once the working temperature (220° C.) has been reached, screw 50 of extruder 42 is rotated with the aid of motor 68 and is supplied with powder by dosers 42 and 46. Conductor 40 is driven by receiving reel 66 at a speed of approximately 15 cm/s.

Under these conditions, a thermoplastic resin grain flow rate of 1.59 kg/h and a tungsten powder flow rate of 12.8 kg/h make it possible to obtain a 1 mm thick X-ray protection sheath containing 30% by volume of tungsten, so that for a diameter 0.5 mm fibres (including the mechanical protective sheath), it is possible to obtain an X-ray protection sheathed optical fibre with a diameter of 2.5 mm.

This production of the X-ray protection sheath 54 of conductor 40 permits a good homogenization of the material forming it.

Other apparatuses permitting the X-ray protection sheathing according to the invention are described in documents U.S. Pat. Nos. 4,480,898, 3,960,530, and French Pat. Nos. 2 536 544 and 2 359 693.

The above description has obviously not been given in a limitative manner and modifications can be made thereto with passing beyond the scope of the invention.

The electrical or optical conductors having the protective sheathing according to the invention can be used wherever these conductors have to be protected against X-rays and more particularly under severe climatic and mechanical conditions. In particular, the invention applies when weight and overall dimensional conditions of a minimum nature are required. It makes it possible to obtain conductors for which the X-ray protection is integrated into the structure of the conductor.

The sheathed electrical and optical conductors according to the invention make it possible, for a filtering efficiency equivalent to that of metal channels, a saving in weight and overall dimensions, as well as a reduction in manufacturing costs. This makes it possible to use the protected conductors according to the invention on aircraft and the like.

What is claimed is:

1. A flexible cable comprising at least one conductor from the group consisting of electrical and optical conductors and an external protection sheath hardened with respect to X-rays, said sheath comprising a flexible X-ray protection sheath externally surrounding said conductor and being formed from a resin matrix containing a regularly dispersed powder of at least one material which is either a metal or an inorganic compound of a metal, the metal having a high atomic number of at least 47, and an anti-SGEMP covering inserted between said conductor and said flexible X-ray protection sheath.

2. A cable according to claim 1, wherein the powder only melts at a temperature at least equal to 630° C.

3. A cable according to claim 1, wherein the flexible sheath has an elongation at break exceeding 50%.

4. A cable according to claim 1, wherein the resin is a polyether block amide, polyether block ester or silicone resin.

5. A cable according to claim 1, wherein the metal with the high atomic number is chosen from the group consisting of silver, tantalum, tungsten and uranium.

6. A cable according to claim 1, wherein said anti-SGEMP covering is formed from at least one element with a low atomic number at the most equal to 6.

7. A cable according to claim 6, wherein the element with the low atomic number is chosen from the group consisting of carbon, boron, and beryllium.

8. A cable according to claim 1, wherein said external protecting sheath comprises a mechanical protection sheath made from a plastic material directly covering the conductor, wherein said conductor is an optical conductor.

9. A cable according to claim 1, wherein said external protecting sheath comprises an electrical insulator directly covering the conductor, wherein said conductor is an electrical conductor.

10. A cable according to claim 1, wherein said flexible X-ray protection sheath is an extruded sheath.

11. A cable according to claim 1, wherein said anti-SGEMP covering has a thickness exceeding the mean free path of electrons emitted during an X-irradiation of said cable.

12. A flexible cable comprising at least one conductor from the group consisting of electrical and optical conductors and an external protection sheath hardened with respect to X-rays, said sheath comprising a flexible X-ray protection sheath externally surrounding said conductor and being formed from a resin matrix containing a regularly dispersed powder of at least one material which is either a metal or an inorganic compound of a metal, the metal having a high atomic number of at least 47, and an anti-SGEMP covering inserted between said conductor and said flexible X-ray protection sheath, wherein the powder represents 25 to 50% volume of the flexible sheath.

13. A flexible cable comprising at least one conductor from the group consisting of electrical and optical conductors and an external protecting sheath hardened with respect to X-rays, wherein said sheath comprises a flexible X-ray protection sheath externally surrounding said conductor and being formed from a resin matrix containing a regularly dispersed powder of tungsten metal, and an anti-SGEMP covering inserted between said conductor and said flexible X-ray protection sheath.

14. A flexible cable comprising at least one conductor from the group consisting of electrical and optical conductors and an external protecting sheath hardened with respect to X-rays, wherein said sheath comprises a flexible X-ray protection sheath externally surrounding said conductor and being formed from a resin matrix containing a regularly dispersed powder of uranium dioxide and tungsten, and an anti-SGEMP covering inserted between said conductor and said flexible X-ray protection sheath.

* * * * *

UNITED STATES PATENT AND TRADEMARK OFFICE
CERTIFICATE OF CORRECTION

PATENT NO. : 4,837,448

DATED : June 6, 1989

INVENTOR(S) : Jean Sainte Luce Banchelin et al.

It is certified that error appears in the above-identified patent and that said Letters Patent is hereby corrected as shown below:

Column 2, line 14, after "various" delete --.--.

Column 3, line 51, delete "micrometers" and insert --micrometres--

Column 3, line 52, delete "micrometers" and insert --micrometres--

Column 4, line 50, delete "micrometers" and insert --micrometres--

Column 5, lines 14 & 15, delete "micrometers" and insert --micrometres-- (2 occurrences).

Signed and Sealed this

Eighth Day of May, 1990

Attest:

HARRY F. MANBECK, JR.

Attesting Officer

Commissioner of Patents and Trademarks